UNITED STATES PATENT OFFICE.

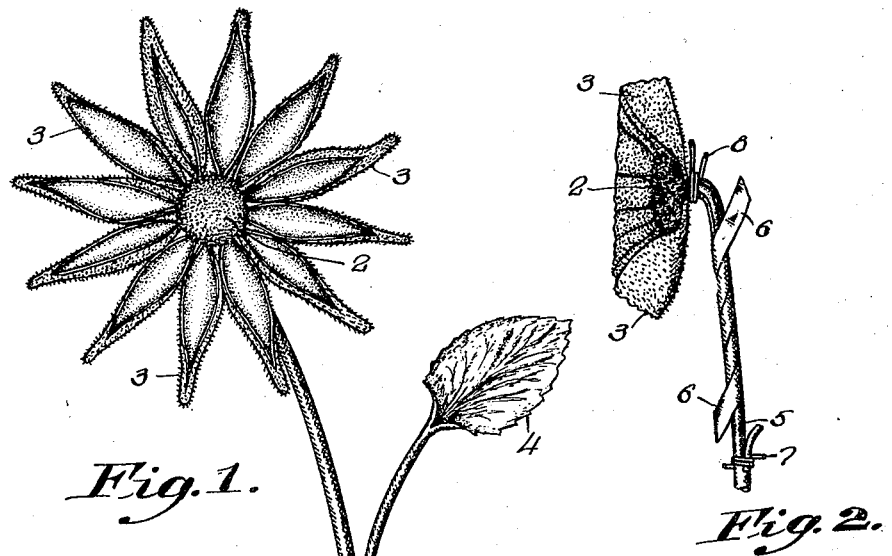
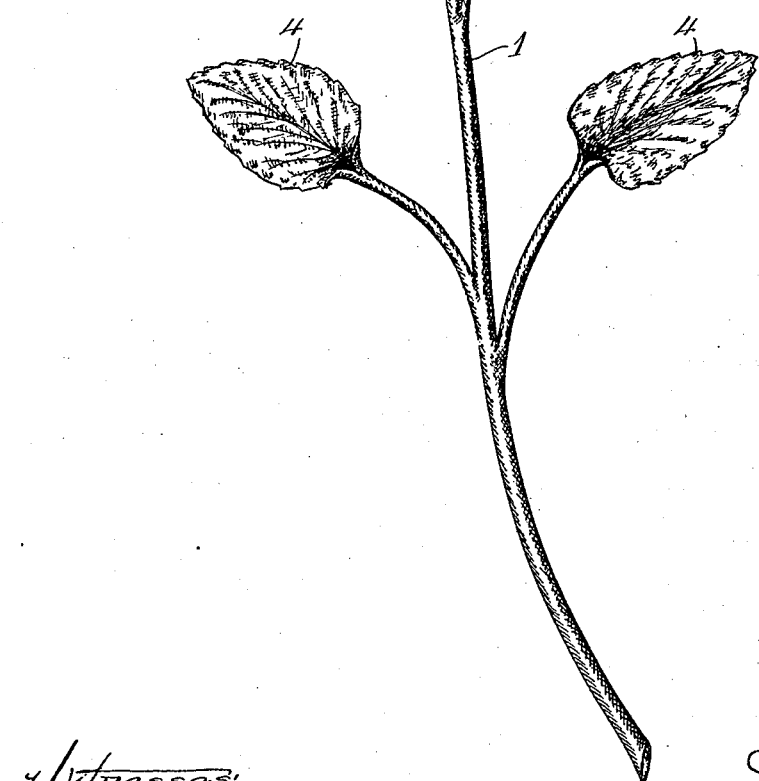

LEOPOLD KOROPP AND VICTOR F. BERGMAN, OF CHICAGO, ILLINOIS.

DECORATIVE PLANT PRODUCT.

1,412,008.   Specification of Letters Patent.   Patented Apr. 4, 1922.

Application filed May 19, 1921. Serial No. 470,824.

*To all whom it may concern:*

Be it known that we, LEOPOLD KOROPP and VICTOR F. BERGMAN, citizens of the United States of America, and residents of Chicago, county of Cook, and State of Illinois, have invented certain new and useful Improvements in Decorative Plant Products, of which the following is a specification.

This invention relates to the decorative arts and especially to the manufacture of artificial flowers and the like. The main objects of the invention are to provide an improved method of making artificial flowers whereby various parts of plants may be artificially treated and arbitrarily compounded to form novel flower and plant designs especially of fanciful and decorative character, with the several parts in substantially their natural form.

An illustrative embodiment of this invention is shown in the accompanying drawings, in which—

Fig. 1 is a perspective view of a fanciful flower composed mainly of natural parts of several different plants.

Fig. 2 is an enlarged detail showing how the parts may be joined together.

Referring to the illustrative embodiment, the stem 1 is secured to the back of a sunflower center 2 and petals 3, consisting of milkweed pods are attached to the back side of said center adjacent to its outer edge. Leaves 4 are attached to said stem in an appropriate manner so as to produce an artistic effect.

The stem 1 comprises a willow stick 5 covered with a winding of tape 6. Wire is preferably used for attaching the leaves to the stem as at 7 and for securing the petals to the flower center, as at 8. All of the above mentioned parts excepting the stick 5, tape 6 and wire 7 are plant growths in their natural form and having substantially their original character and appearance except for such ornamental coloring or other decoration as may be applied artificially, as for instance, paint, powder, floss or the like. These natural plant parts before assembling are artificially treated to give them lasting qualities, both as to color and other physical attributes, substantially in accordance with the method set forth in our co-pending application Serial No. 314,813, filed August 2, 1919.

This method is especially adapted for producing large and massive effects such as may be used to advantage in store display windows, hotel dining rooms and on theatrical stages and the like.

Some of the most effective and popular designs produced under this invention are enlarged imitations of sunflowers and poinsettias. Such poinsettias may be made by attaching a compound flower of branchy character to the end of a stem and surrounding this on said stem with a fringe of richly colored milkweed pods set like the leaf-like bracts which surround the small greenish-yellow flower-head of a real poinsettia.

It is to be understood that some of the details of the construction shown may be altered or omitted without departing from the spirit of this invention as defined by the following claims.

We claim:

1. An artificial flower including in combination a flower center and a series of milkweed pods arranged like petals thereon, said flower center and milkweed pods being of natural growth.

2. A manufactured flower comprising a stem, leaves of natural growth fastened to said stem, a tape wound around said stem in spiral form and covering the connections between said stem and leaves, a discoidal seed pod mounted on one end of said stem, and a plurality of mature milkweed pods connected to the periphery of said discoidal pod and arranged radially with the stem ends of said milkweed pods pointed outwardly, said pods being of natural growth and combined to simulate a poinsettia.

Signed at Chicago this 29 day of Nov. 1920.

LEOPOLD KOROPP.
VICTOR F. BERGMAN.